(No Model.)
P. J. COONEY.
STOP FOR REELS OF HOSE CARRIAGES.
No. 341,456. Patented May 11, 1886.
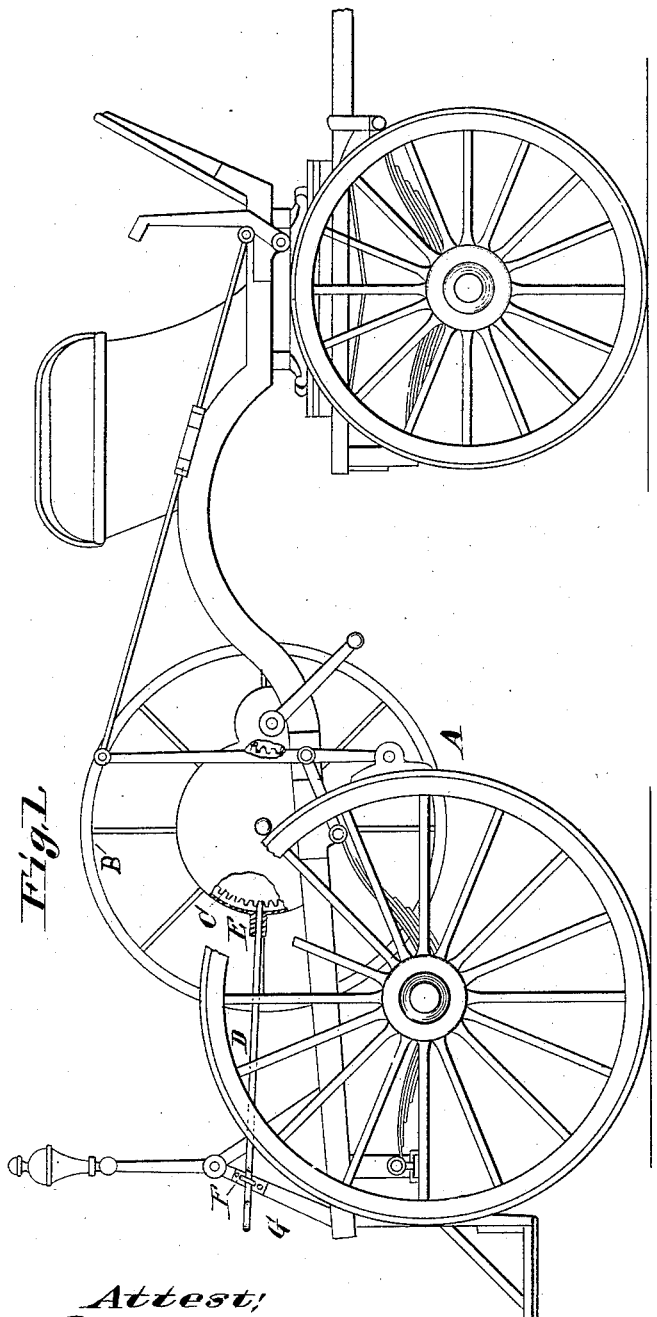
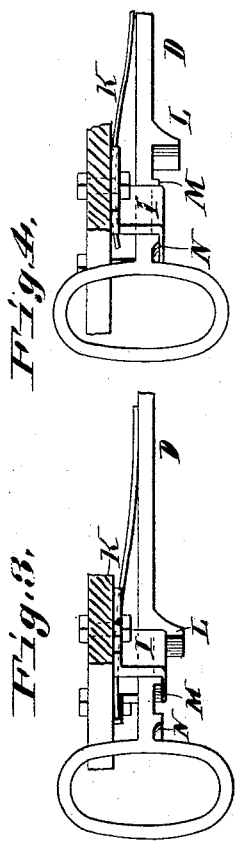
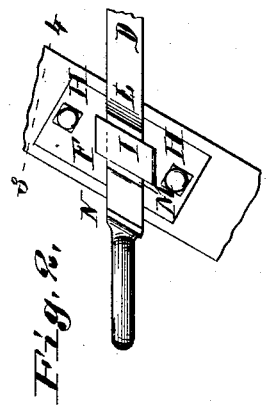
Attest:
F. A. Hopkins
Geo. L. Wheelock
Inventor:
P. J. Cooney
By Knight Bro
attys
N. PETERS, Photo-Lithographer, Washington, D. C.

UNITED STATES PATENT OFFICE.

PATRICK J. COONEY, OF ST. LOUIS, MISSOURI.

STOP FOR REELS OF HOSE-CARRIAGES.

SPECIFICATION forming part of Letters Patent No. 341,456, dated May 11, 1886.

Application filed January 14, 1886. Serial No. 188,573. (No model.)

*To all whom it may concern:*

Be it known that I, PATRICK J. COONEY, of the city of St. Louis, in the State of Missouri, have invented a certain new and useful Improvement in Brake Attachments for Reels of Hose-Carriages, of which the following is a full, clear, and exact description, reference being had to the accompanying drawings, forming part of this specification, and in which—

Figure 1 is a side elevation of a hose-wagon, showing my improved lock or stop. Fig. 2 is an enlarged detail view of the outer end of the stop bar or lever. Figs. 3 and 4 are horizontal detail sections taken on line 3 4, Fig. 2, Fig. 3 showing the bar in its outer position and Fig. 4 showing it in its inner position.

My invention relates to an improved stop-bar, and to the manner of securing it to the wagon; and it consists in features of novelty hereinafter fully described, and pointed out in the claims.

Referring to the drawings, A represents a hose-wagon of any well-known construction. B represents the reel, provided with a cog-wheel, C. D represents the locking-bar supported at its inner end by a neck, E, on the housing of the reel B, and supported at its outer end by a bracket, F, secured to the wagon. The bracket F is removably secured to a standard or extension, G, of the wagon by bolts H, so that it can be taken off or put on any wagon, and can be renewed if broken. It has a keeper, I, through which the outer end of the lock-bar passes. The bar is held out against the keeper, as shown in Figs. 3 and 4, by a spring, K, and it is provided with lugs or projections L, M, and N. When the rod is shoved inward, its inner end fits between the cogs of the wheel C and locks the reel from turning. It is held in this position by the keeper I fitting between the projections M and N, as shown in Fig. 4. When the rod is pulled back, its free end is removed from the cogs of the wheel C, and the reel may be turned. When in this position, it is held from movement by the keeper I fitting between the lugs L and M, as shown in Figs. 2 and 3. The lug M is made short, so that by pushing inward on the free end of the bar the spring K will be compressed and allow the projections to pass through the keeper. The projection L, however, is made quite long, so that the pressing in of the bar to any distance to which it is capable will not allow the lug to pass through the keeper, so that the movement of the bar is thus limited.

I claim as my invention—

1. The combination of a reel provided with the cog-wheel, lock-bar, and removable bracket, arranged and operating substantially as and for the purpose set forth.

2. The combination of a hose-reel provided with a cog-wheel, lock-bar, fitting in an extension of the reel and provided with a spring, K, on its outer end, removable bracket, and projections L, M, and N on the bar, the projection L being elongated, for the purpose set forth.

PATRICK J. COONEY.

In presence of—
SAML. KNIGHT,
EDW. S. KNIGHT.